(12) United States Patent
Takahashi (10) Patent No.: US 11,595,540 B2
(45) Date of Patent: Feb. 28, 2023

(54) IMAGE SIGNAL PROCESSING DEVICE, IMAGE READING APPARATUS TO EXTRACT LINE IMAGE DATA FROM AN IMAGE SIGNAL WHEN HORIZONTAL SYNCHRONIZATION PULSES ARE DETERMINED AS NORMAL, AND A DETERMINATION PORTION DETERMINES WHETHER HORIZONTAL SYNCHRONIZATION PULSES ARE NORMAL BY COMPARING TIME DIFFERENCES BETWEEN THE INPUT OF THE HORIZONTAL SYNCHRONIZATION PULSES AND INPUT OF THE REFERENCE PULSES WITH A SHIFT TIME

(71) Applicant: KYOCERA Document Solutions Inc., Osaka (JP)

(72) Inventor: Masayoshi Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/653,752

(22) Filed: Mar. 7, 2022

(65) Prior Publication Data

US 2022/0311899 A1 Sep. 29, 2022

(30) Foreign Application Priority Data

Mar. 29, 2021 (JP) .............................. JP2021-054781

(51) Int. Cl.
*H04N 1/053* (2006.01)
*H04N 1/04* (2006.01)
*H04N 1/00* (2006.01)

(52) U.S. Cl.
CPC ......... *H04N 1/053* (2013.01); *H04N 1/00933* (2013.01); *H04N 1/0443* (2013.01); *H04N 1/0446* (2013.01); *H04N 2201/04732* (2013.01)

(58) Field of Classification Search
CPC ............. H04N 1/00933; H04N 1/0443; H04N 1/0446; H04N 1/0473; H04N 1/053; H04N 2201/04732; G01V 2200/12
(Continued)

(56) References Cited

U.S. PATENT DOCUMENTS 10,924,663 B2 * 2/2021 Ito ....................... H04N 5/23227
2017/0085755 A1 * 3/2017 Kim, II .................. H04N 5/067

FOREIGN PATENT DOCUMENTS

JP  2000206951 A  *  7/2000
JP  2013162343 A     8/2013

* cited by examiner

*Primary Examiner* — Chad Dickerson
(74) *Attorney, Agent, or Firm* — Alleman Hall Creasman & Tuttle LLP (57) ABSTRACT

An image signal processing device includes a reference signal generating portion, a determination portion, and an extraction portion. The reference signal generating portion generates and outputs a reference signal that sequentially transmits reference pulses shifted from horizontal synchronization pulses on a horizontal synchronization signal by a predetermined shift time. The determination portion determines whether the horizontal synchronization pulses are normal by comparing time differences between input of the horizontal synchronization pulses and input of the reference pulses with the shift time. The extraction portion extracts line image data points from an image signal in synchronization with the input of the horizontal synchronization pulses that have been determined as normal.

5 Claims, 5 Drawing Sheets

(58) Field of Classification Search
USPC .................. 358/471, 1.9, 2.1, 505, 409, 410
See application file for complete search history.

IMAGE SIGNAL PROCESSING DEVICE, IMAGE READING APPARATUS TO EXTRACT LINE IMAGE DATA FROM AN IMAGE SIGNAL WHEN HORIZONTAL SYNCHRONIZATION PULSES ARE DETERMINED AS NORMAL, AND A DETERMINATION PORTION DETERMINES WHETHER HORIZONTAL SYNCHRONIZATION PULSES ARE NORMAL BY COMPARING TIME DIFFERENCES BETWEEN THE INPUT OF THE HORIZONTAL SYNCHRONIZATION PULSES AND INPUT OF THE REFERENCE PULSES WITH A SHIFT TIME

INCORPORATION BY REFERENCE

This application is based upon and claims the benefit of priority from the corresponding Japanese Patent Application No. 2021-054781 filed on Mar. 29, 2021, the entire contents of which are incorporated herein by reference.

BACKGROUND

The present disclosure relates to an image signal processing device configured to extract line image data from an image signal in synchronization with input of horizontal synchronization pulses to a horizontal synchronization signal, and relates to an image reading apparatus.

An image reading apparatus includes an image reading portion that reads images from document sheets and that outputs an image signal and an image signal processing device that processes the image signal. The image signal processing device extracts line image data from the image signal in synchronization with input of horizontal synchronization pulses to a horizontal synchronization signal.

In addition, the image reading apparatus is known to count data points in the image signal to detect abnormalities in the horizontal synchronization signal based on the count value obtained when the horizontal synchronization pulses are input.

SUMMARY

An image signal processing device according to an aspect of the present disclosure is included in an image reading apparatus provided with an image reading portion and a synchronization signal generating portion. The image reading portion is configured to sequentially read single line images, each serving as an image of a single line extending in a main scanning direction, from a document sheet and to output an image signal that sequentially transmits line image data points that represent the single line images. The synchronization signal generating portion is configured to generate and output a horizontal synchronization signal that sequentially transmits horizontal synchronization pulses synchronized with timing of reading the single line images. The image signal processing device is configured to extract the line image data points from the image signal in synchronization with input of the horizontal synchronization pulses. The image signal processing device includes a reference signal generating portion, a determination portion, and an extraction portion. The reference signal generating portion is configured to generate and output a reference signal that sequentially transmits reference pulses shifted from the horizontal synchronization pulses by a shift time set in advance. The determination portion is configured to determine whether the horizontal synchronization pulses are normal by comparing time differences between the input of the horizontal synchronization pulses and input of the reference pulses with the shift time. The extraction portion is configured to extract the line image data points from the image signal in synchronization with the input of the horizontal synchronization pulses that have been determined as normal.

An image reading apparatus according to another aspect of the present disclosure includes the image reading portion, the synchronization signal generating portion, and the image signal processing device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

First Embodiment

An image reading apparatus 1 according to a first embodiment reads images from document sheets 9 and outputs data representing the read images.

Figure 1:
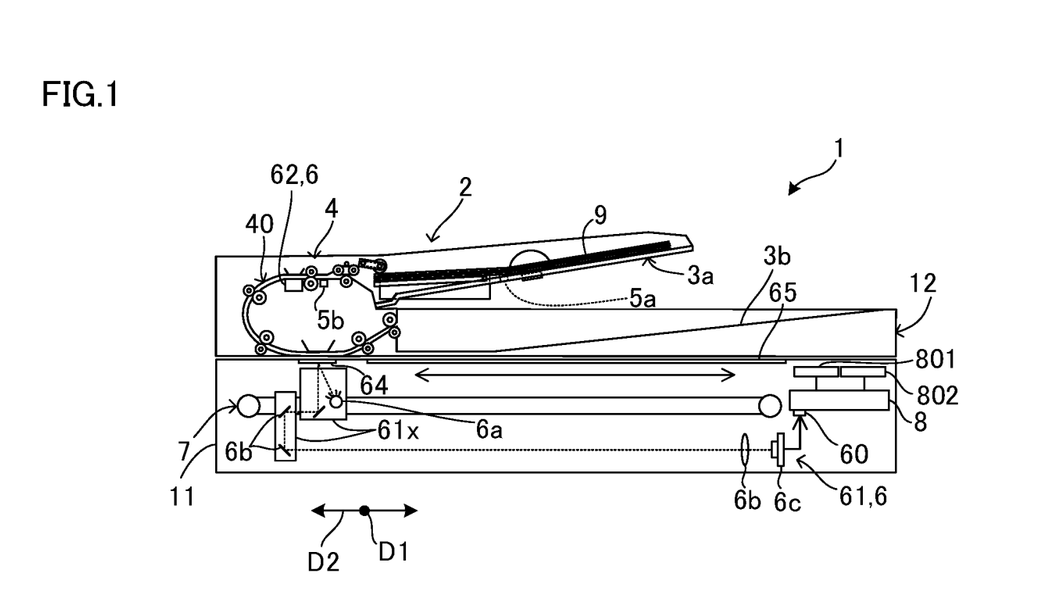
FIG. 1 is a configuration diagram of an image reading apparatus according to a first embodiment.

As shown in FIG. 1, the image reading apparatus 1 includes a body portion 11 and a cover portion 12 that covers the upper surface of the body portion 11. The body portion 11 is a housing that holds various types of components. The cover portion 12 is supported to be displaceable between a position at which the upper surface of the body portion 11 is covered and a position at which the upper surface of the body portion 11 is uncovered.

The image reading apparatus 1 further includes a contact glass 64 and a platen glass 65 disposed on the upper surface of the body portion 11. The contact glass 64 and the platen glass 65 are transparent plate-like members.

The image reading apparatus 1 further includes a document sheet conveying device 2, an image reading portion 6, a moving mechanism 7, a control device 8, an operation device 801, and a display device 802. The document sheet conveying device 2 is integrated into the cover portion 12.

The document sheet conveying device 2 includes a supply tray 3a, a discharge tray 3b, a conveyance path 40, a conveying device 4, a supplied document sheet sensor 5a, and a conveyed document sheet sensor 5b. The conveyance path 40 forms a path along which the document sheets 9 are conveyed.

The supply tray 3a and the discharge tray 3b can hold the document sheets 9. The supplied document sheet sensor 5a detects the document sheets 9 placed on the supply tray 3a. The conveyed document sheet sensor 5b detects the document sheets 9 fed from the supply tray 3a to the conveyance path 40.

The conveying device 4 feeds the document sheets 9 on the supply tray 3a one by one to the conveyance path 40, conveys the document sheets 9 along the conveyance path 40, and then discharges the document sheets 9 onto the discharge tray 3b.

The image reading portion 6 executes an image reading process of reading images formed on the document sheets 9 and outputting data about the read images. The image reading portion 6 can execute the image reading process on the document sheets 9 conveyed along the conveyance path 40.

The image reading portion 6 can also execute the image reading process on the document sheets 9 placed on the platen glass 65. In the description below, the images read from the document sheets 9 by the image reading portion 6 are referred to as "read images".

In the present embodiment, the image reading portion 6 includes a first image reading portion 61, a second image reading portion 62, and an AFE (Analog Front End) 60.

In the description below, the upper surfaces of the document sheets 9 placed on the supply tray 3a are referred to as "first sides", and the lower surfaces of the document sheets 9 placed on the supply tray 3a are referred to as "second sides".

The first image reading portion 61 reads images on the first sides of the document sheets 9 conveyed along the contact glass 64. The second image reading portion 62 reads images on the second sides of the document sheets 9 conveyed along the conveyance path 40.

In the present embodiment, the first image reading portion 61 and the second image reading portion 62 each include a light emitting portion 6a, light guide portions 6b, and an image sensor 6c. The light emitting portions 6a, the light guide portions 6b, and the image sensors 6c extend in a main scanning direction D1.

The main scanning direction D1 is a direction that intersects with a conveying direction in which the document sheets 9 are conveyed along the conveyance path 40.

The light emitting portions 6a emit light beams onto the document sheets 9. The light guide portions 6b guide the light beams reflected from the document sheets 9 to the respective image sensors 6c. The image sensors 6c are line sensors that determine the intensity of the light beams reflected from the document sheets 9 and that output detection signals as signals of the read images.

The AFE 60 converts the signals of the read images into digital image data and outputs the image data. The digital image data corresponds to data about the read images.

In the example shown in FIG. 1, the image sensor 6c of the first image reading portion 61 is a CCD (Charge Coupled Device) sensor. The light emitting portion 6a and some of the light guide portion 6b in the first image reading portion 61 are supported by carriages 61x.

The moving mechanism 7 moves the carriages 61x in a sub-scanning direction D2 from a standard position facing the contact glass 64 across an area facing the platen glass 65. The sub-scanning direction D2 is a direction that intersects with the main scanning direction D1.

In a case where the document sheets 9 are conveyed by the conveying device 4, the moving mechanism 7 keeps the carriages 61x at the standard position. While the carriages 61x are kept at the standard position, the light emitting portion 6a of the first image reading portion 61 scans the light beam over the document sheets 9 passing through the contact glass 64, and the image sensor 6c of the first image reading portion 61 reads the images on the document sheets 9.

In a case where the document sheets 9 are placed on the platen glass 65, the moving mechanism 7 moves the carriages 61x in the sub-scanning direction D2 below the platen glass 65. Thus, the light emitting portion 6a of the first image reading portion 61 scans the light beam over the document sheets 9 on the platen glass 65, and the image sensor 6c of the first image reading portion 61 reads the images on the document sheets 9.

That is, when the conveying device 4 operates, the first image reading portion 61 executes the image reading process on the document sheets 9 conveyed along the conveyance path 40. In contrast, when the conveying device 4 does not operate, the first image reading portion 61 executes the image reading process on the document sheets 9 placed on the platen glass 65.

The second image reading portion 62 is a CIS (Contact Image Sensor) unit including the light emitting portion 6a, the light guide portions 6b, and the image sensor 6c of the CMOS (Complementary Metal Oxide Semiconductor) type integrated together.

The operation device 801 is configured to receive operations from users and includes, for example, operation buttons and a touch panel. The display device 802 is configured to display information and includes, for example, a panel display device such as a liquid crystal display unit.

Figure 2:
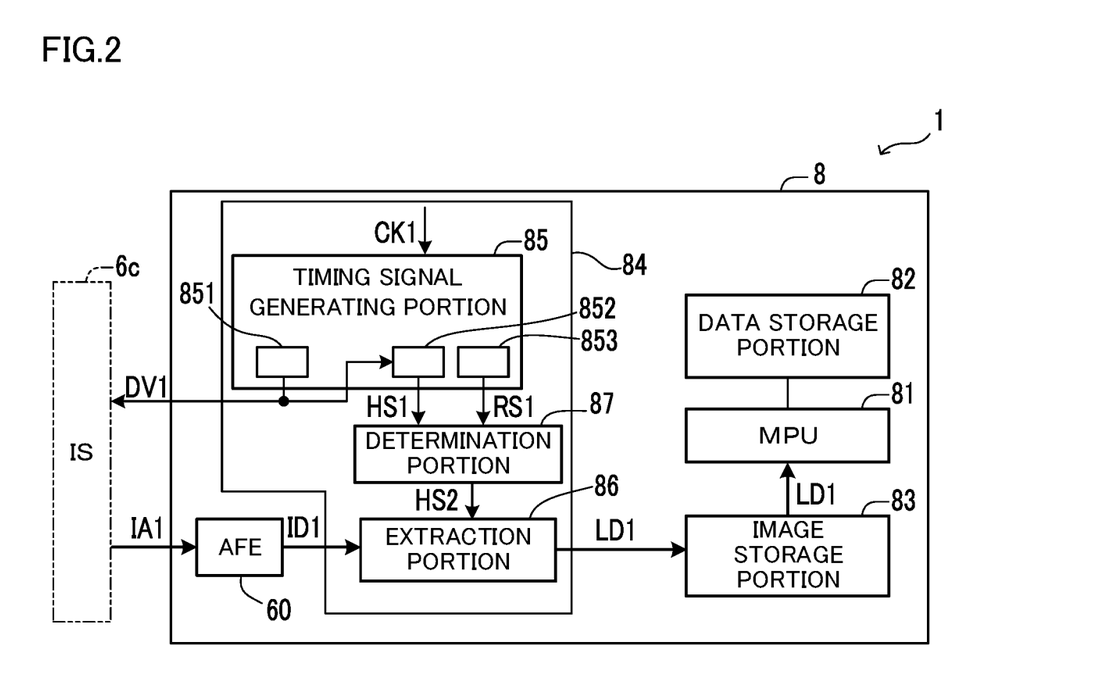
FIG. 2 is a block diagram showing a configuration of a control device in the image reading apparatus according to the first embodiment.

The control device 8 executes various types of data processing and controls the image reading apparatus 1. As shown in FIG. 2, the control device 8 includes an MPU (Micro Processing Unit) 81, a data storage portion 82, an image storage portion 83, and an image signal processing device 84.

The data storage portion 82 includes a computer-readable nonvolatile storage device and a RAM (Random Access Memory). The data storage portion 82 can store and update computer programs executed by the MPU 81 and various types of data.

The image storage portion 83 is a frame memory in which image data is to be stored. The image storage portion 83 sequentially stores line image data points LD1 each representing a single line image, which is an image of a single line extending in the main scanning direction D1, of the document sheets 9.

The MPU 81 reads the line image data points LD1 of multiple lines from the image storage portion 83 and executes various types of image processing on the read data.

In the image reading portion 6, each of the image sensors 6c receives a drive signal DV1 that sequentially transmits drive pulses. The drive pulses each represent a command to start reading a single line image in the main scanning direction D1.

The image sensor 6c executes a line image reading process in synchronization with the drive pulses. The line image reading process is a process of reading a single line image in the main scanning direction D1 from the document sheets 9.

The image sensor 6c sequentially executes the line image reading process in synchronization with the drive pulses and outputs an analog image signal IA1 that represents the read images. The AFE 60 of the image reading portion 6 digitizes the analog image signal IA1 and outputs a digital image signal ID1 that sequentially transmits the line image data points LD1 (see FIGS. 2 and 3).

In the present embodiment, the image signal processing device 84 extracts the line image data points LD1 from the digital image signal ID1 corresponding to the image sensor 6c of the CCD type. It is noted that the image signal processing device 84 may extract the line image data points LD1 from the digital image signal ID1 corresponding to the image sensor 6c of the CMOS type.

The image signal processing device 84 includes a timing signal generating portion 85 and an extraction portion 86. The timing signal generating portion 85 receives a clock signal CK1 generated by an oscillator (not shown) and generates and outputs various types of timing signals based on the clock signal CK1.

The image signal processing device 84 counts clock pulses on the clock signal CK1 to measure time regarding generation of pulses on various types of signals.

The timing signal generating portion 85 includes a drive signal generating portion 851 and a synchronization signal generating portion 852. For example, the image signal processing device 84 is composed of an electronic circuit such as an ASIC (Application Specific Integrated Circuit) or a DSP (Digital Signal Processor).

The drive signal generating portion 851 generates the drive signal DV1 that sequentially transmits the drive pulses and outputs the drive signal DV1 to the image sensor 6c.

Figure 3:
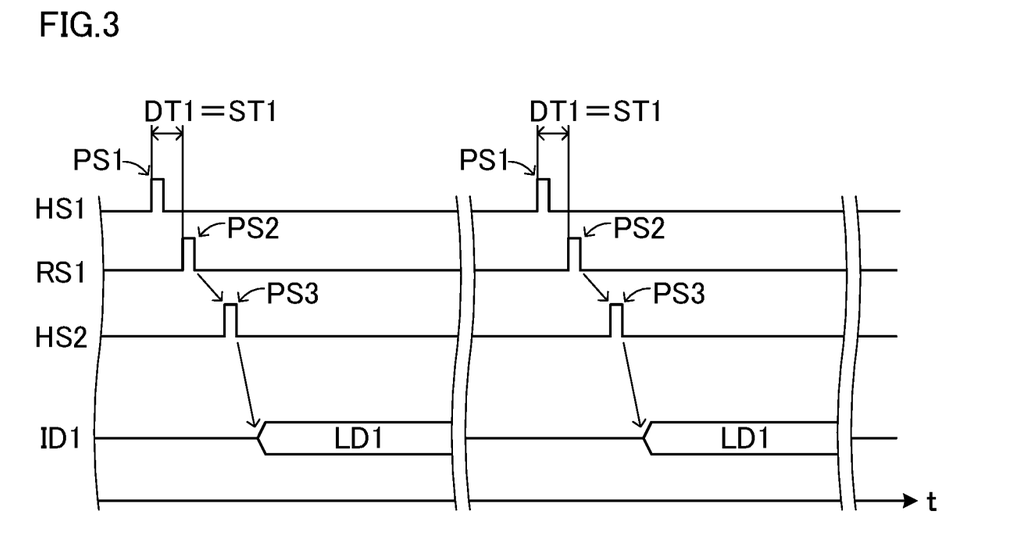
FIG. 3 shows a first example of a timing chart of signals associated with image signal processing in the image reading apparatus according to the first embodiment.

The synchronization signal generating portion 852 generates and outputs a horizontal synchronization signal HS1 that sequentially transmits horizontal synchronization pulses PS1 synchronized with timing of reading the single line images (see FIGS. 2 and 3).

Figure 4:
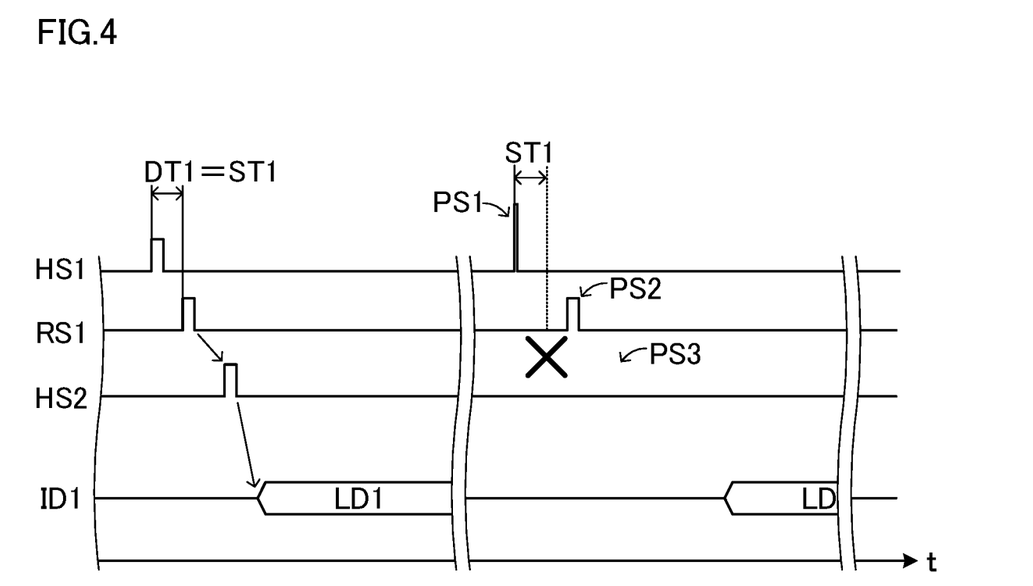
FIG. 4 shows a second example of the timing chart of the signals associated with the image signal processing in the image reading apparatus according to the first embodiment.
Figure 5:
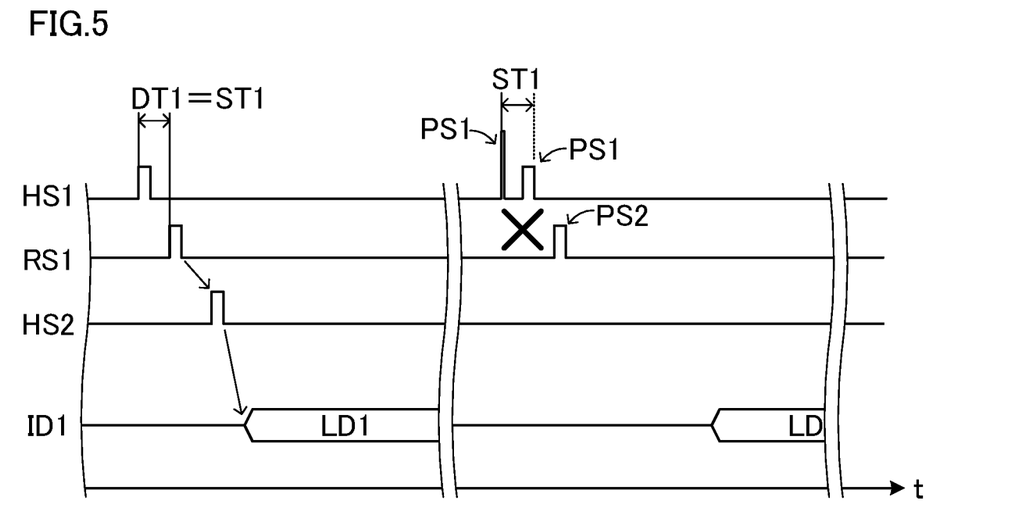
FIG. 5 shows a third example of the timing chart of the signals associated with the image signal processing in the image reading apparatus according to the first embodiment.

FIGS. 3 to 5 show examples in which various types of signals transmit active-high pulses. However, part of or all of the various types of signals may transmit active-low pulses.

For example, the synchronization signal generating portion 852 generates the horizontal synchronization pulses PS1 by delaying the drive pulses on the drive signal DV1 for a predetermined time and outputs the generated horizontal synchronization pulses PS1 as the horizontal synchronization signal HS1.

The drive signal generating portion 851 may also serve as the synchronization signal generating portion 852. In this case, the drive signal DV1 is output as the horizontal synchronization signal HS1.

The extraction portion 86 sequentially extracts the line image data points LD1 from the digital image signal ID1 in synchronization with the input of the horizontal synchronization pulses PS1 and stores the extracted line image data points LD1 in the image storage portion 83.

The horizontal synchronization signal HS1 may contain noise pulses. In this case, the image signal processing device 84 may erroneously extract the line image data points LD1 from the digital image signal ID1 in synchronization with the noise pulses. The erroneous extraction causes abnormal images to be output.

In addition, in a case where the image signal processing device 84 measures intervals between pulses on the horizontal synchronization signal HS1 and obtains abnormal measurement results, the image signal processing device 84 may determine that the horizontal synchronization signal HS1 is abnormal.

However, measurement of the intervals between the horizontal synchronization pulses PS1 requires a relatively large-scale counter circuit or a time measurement process that imposes relatively high loads on a processor.

Furthermore, in a case where the intervals between the horizontal synchronization pulses PS1 vary depending on the conditions, the circuit or the process of measuring the pulse intervals becomes complicated.

In addition, in a case where spread-spectrum clocking is adopted, the number of clock cycles between two horizontal synchronization pulses PS1 may vary. In this case, the measurement of the pulse intervals becomes more difficult.

As shown in FIG. 2, the image signal processing device 84 further includes a reference signal generating portion 853 and a determination portion 87. This allows the image signal processing device 84 to determine whether the horizontal synchronization signal HS1 has any abnormalities using a simple configuration.

In the present embodiment, the reference signal generating portion 853 partly constitutes the timing signal generating portion 85.

The reference signal generating portion 853 generates and outputs a reference signal RS1 that sequentially transmits reference pulses PS2 shifted from the horizontal synchronization pulses PS1 by a predetermined shift time ST1 (see FIGS. 2 and 3).

FIG. 3 shows an example in which the reference signal generating portion 853 generates the reference pulses PS2 by delaying the horizontal synchronization pulses PS1 for the shift time ST1.

The pulses on the horizontal synchronization signal HS1 are the normal horizontal synchronization pulses PS1 or the noise pulses. However, in the description below, all the pulses on the horizontal synchronization signal HS1 are referred to as "horizontal synchronization pulses PS1" for convenience. Similarly, all the pulses on the reference signal RS1 are referred to as "reference pulses PS2". In addition, the noise pulses on the horizontal synchronization signal HS1 are referred to as "abnormal horizontal synchronization pulses PS1".

The determination portion 87 receives the horizontal synchronization signal HS1 and the reference signal RS1. Furthermore, the determination portion 87 measures pulse time differences DT1 (see FIG. 3) serving as time differences between the horizontal synchronization pulses PS1 and the corresponding reference pulses PS2.

FIGS. 3 to 5 show examples in which the input of each pulse is detected on the rising edge of the pulse. The input of each pulse may be detected on the falling edge of the pulse.

Furthermore, the determination portion 87 determines whether the horizontal synchronization pulses PS1 are normal by comparing the pulse time differences DT1 with the shift time ST1.

The determination portion 87 determines that the horizontal synchronization pulses PS1 are normal at least based on a necessary condition that the pulse time differences DT1 correspond with the shift time ST1. It is noted that the correspondence of the pulse time differences DT1 with the shift time ST1 includes approximation of the pulse time differences DT1 to the shift time ST1 within a range of a predetermined allowable error.

In general, the noise pulses are electrostatic noise that occurs due to discharge of accumulated charges. Such electrostatic noise does not occur in succession within a short time. The effect of the electrostatic noise usually disappears in about 100 to 200 nanoseconds. Accordingly, it is desirable that the shift time ST1 be longer than 200 nanoseconds.

In the present embodiment, the determination portion 87 determines that the horizontal synchronization pulses PS1 are normal when the pulse time differences DT1 correspond with the shift time ST1, otherwise the determination portion 87 determines that the horizontal synchronization pulses PS1 are abnormal.

Specifically, the determination portion 87 determines that the horizontal synchronization pulses PS1 are abnormal when the reference pulses PS2 are not input before the shift time ST1 has passed since the input of the horizontal synchronization pulses PS1 (see FIG. 4).

Furthermore, the determination portion 87 determines that the horizontal synchronization pulses PS1 are abnormal when the horizontal synchronization pulses PS1 are input before the shift time ST1 has passed since the input of the previous horizontal synchronization pulses PS1 (see FIG. 5).

Furthermore, the determination portion 87 determines that the horizontal synchronization pulses PS1 are abnormal when the pulse time differences DT1 are shorter than the shift time ST1.

The determination portion 87 outputs an extraction command signal HS2 that sequentially transmits extraction command pulses PS3 synchronized with the input of the horizontal synchronization pulses PS1 that have been determined as normal (see FIG. 3).

For example, the determination portion 87 outputs the extraction command pulses PS3 obtained by delaying the horizontal synchronization pulses PS1 that have been determined as normal or the corresponding reference pulses PS2 for a predetermined time.

It is noted that the extraction command pulses PS3 obtained by delaying the horizontal synchronization pulses PS1 or the corresponding reference pulses PS2 are pulses synchronized with the horizontal synchronization pulses PS1.

In contrast, upon determining that the horizontal synchronization pulses PS1 are abnormal, the determination portion 87 does not output the extraction command pulses PS3.

The extraction portion 86 receives the extraction command signal HS2 and extracts the line image data points LD1 from the digital image signal ID1 in synchronization with the extraction command pulses PS3. Accordingly, the extraction portion 86 extracts the line image data points LD1 from the digital image signal ID1 in synchronization with the input of the horizontal synchronization pulses PS1 that have been determined as normal.

The extraction portion 86 does not extract the line image data points LD1 corresponding to the horizontal synchronization pulses PS1 that have been determined as abnormal.

The extraction portion 86 may set alternative line data points as the line image data points LD1 corresponding to the horizontal synchronization pulses PS1 that have been determined as abnormal. For example, the alternative line data points are the line image data points LD1 of the previous lines. The alternative line data points may be obtained by averaging the line image data points LD1 of the previous lines and the line image data points LD1 of the following lines.

The image signal processing device 84 can determine whether the horizontal synchronization signal HS1 has any abnormalities using the simple configuration.

Second Embodiment

The following describes an image reading apparatus 1A according to a second embodiment with reference to FIGS. 6 to 9.

Figure 6:
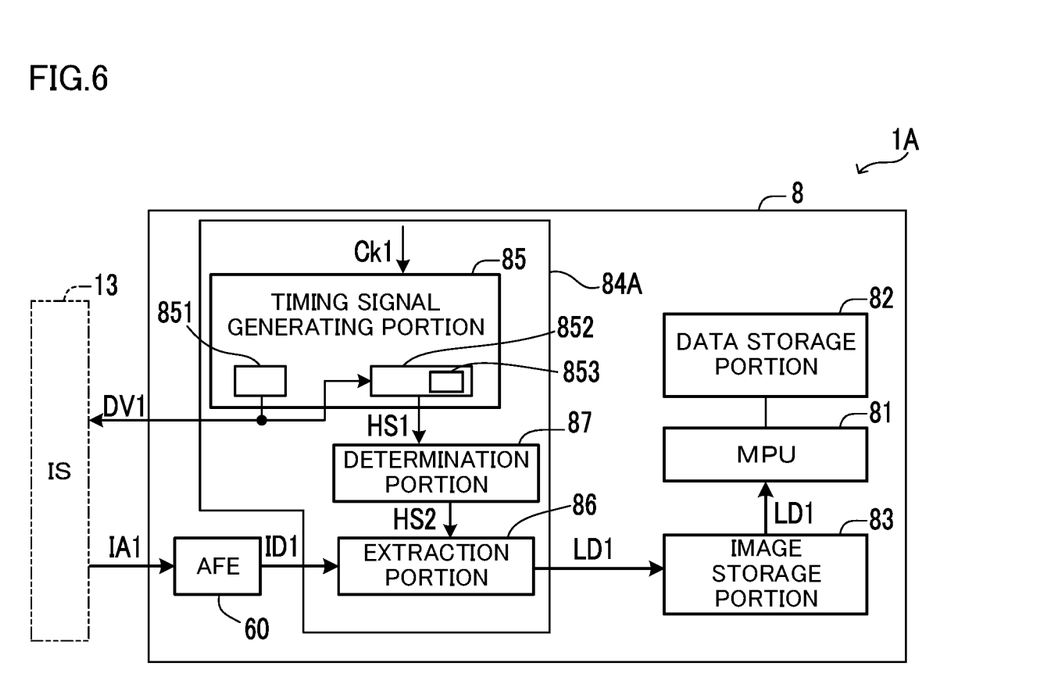
FIG. 6 is a block diagram showing a configuration of a control device in an image reading apparatus according to a second embodiment.

The image reading apparatus 1A includes an image signal processing device 84A instead of the image signal processing device 84 in the image reading apparatus 1 (see FIG. 6).

In the image signal processing device 84A, the synchronization signal generating portion 852 includes the reference signal generating portion 853. The reference signal generating portion 853 outputs the reference pulses PS2 such that the reference pulses PS2 are included in the horizontal synchronization signal HS1 that also serves as the reference signal RS1 (see FIG. 7).

Figure 7:
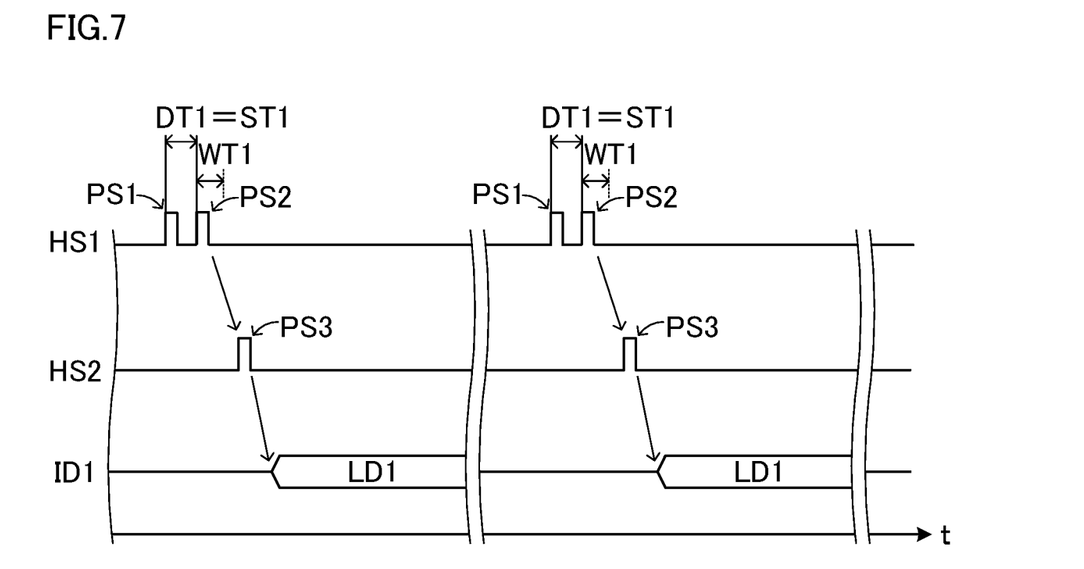
FIG. 7 shows a first example of a timing chart of signals associated with image signal processing in the image reading apparatus according to the second embodiment.

In the present embodiment, the determination portion 87 measures time differences between two pulses successively input to the horizontal synchronization signal HS1 as the pulse time differences DT1 (see FIG. 7). As described above, the pulse time differences DT1 are time differences between the horizontal synchronization pulses PS1 and the corresponding reference pulses PS2.

Figure 8:
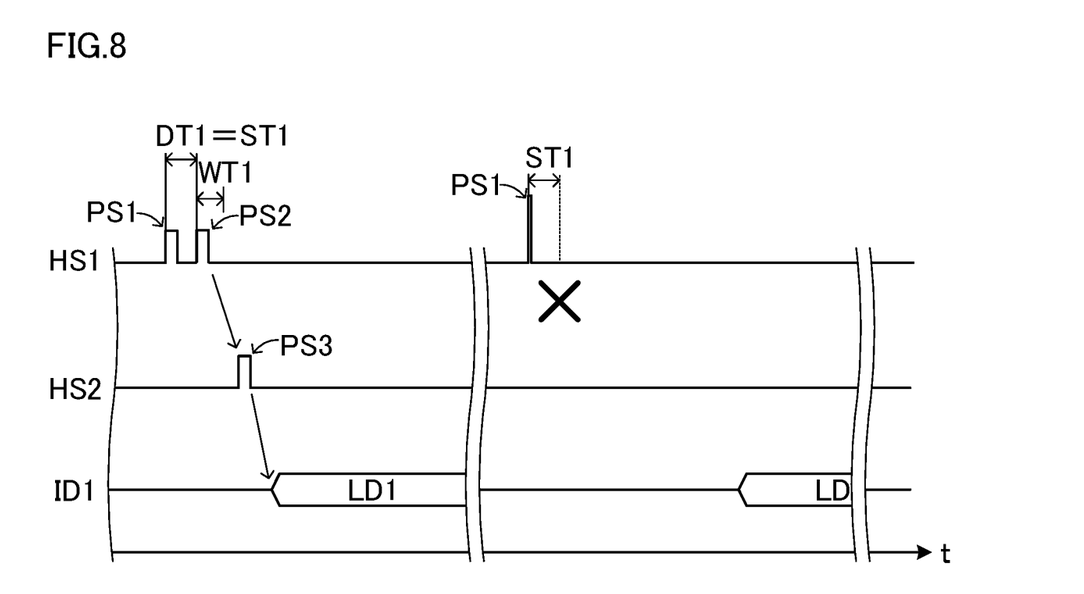
FIG. 8 shows a second example of the timing chart of the signals associated with the image signal processing in the image reading apparatus according to the second embodiment.
Figure 9:
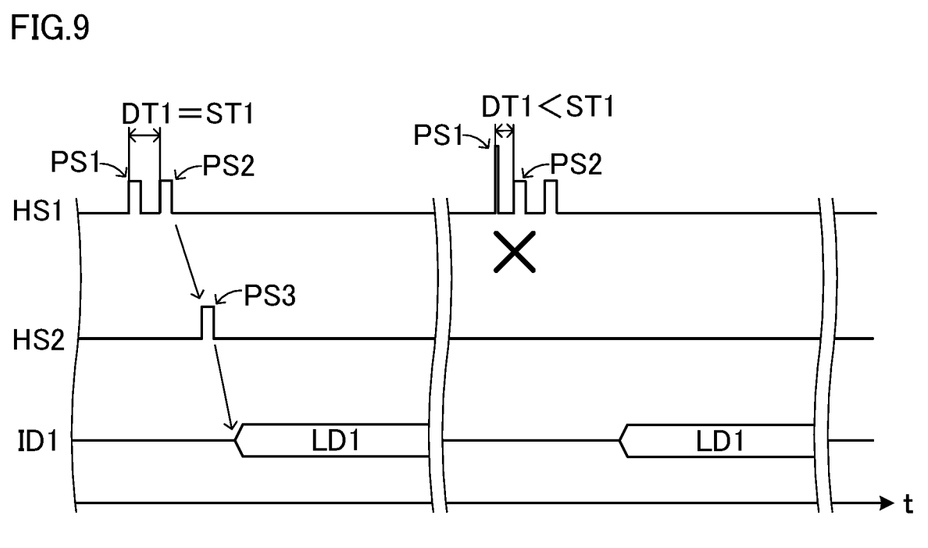
FIG. 9 shows a third example of the timing chart of the signals associated with the image signal processing in the image reading apparatus according to the second embodiment.

FIGS. 7 to 9 show examples in which various types of signals transmit active-high pulses. However, part of or all of the various types of signals may transmit active-low pulses.

In addition, FIGS. 7 to 9 show examples in which the input of each pulse is detected on the rising edge of the pulse. The input of each pulse may be detected on the falling edge of the pulse.

In the present embodiment, the determination portion 87 determines that the horizontal synchronization pulses are normal when a predetermined "normal" condition is met. The "normal" condition is a condition that the pulse time differences DT1 correspond with the shift time ST1 and, at the same time, that third pulses are not input to the horizontal synchronization signal HS1 within a predetermined observation time WT1 (see FIG. 7).

Specifically, the determination portion 87 determines that the horizontal synchronization pulses PS1 are abnormal when second pulses are not input before the shift time ST1 has passed since the input of first pulses (see FIG. 8).

Furthermore, the determination portion 87 determines that the horizontal synchronization pulses PS1 are abnormal when the pulse time differences DT1 are shorter than the shift time ST1 (see FIG. 9).

The image signal processing device 84A also produces effects similar to those produced by the image signal processing device 84.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image signal processing device in an image reading apparatus, the image signal processing device configured to extract line image data points from an image signal in synchronization with input of horizontal synchronization pulses, the image reading apparatus comprising:
an image reading portion configured to sequentially read single line images, each serving as an image of a single line extending in a main scanning direction, from a document sheet and to output the image signal that sequentially transmits the line image data points that represent the single line images; and
a synchronization signal generating portion configured to generate and output a horizontal synchronization signal that sequentially transmits the horizontal synchronization pulses synchronized with timing of reading the single line images, the image signal processing device comprising:
a reference signal generating portion configured to generate and output a reference signal that sequentially transmits reference pulses shifted from the horizontal synchronization pulses by a shift time set in advance;
a determination portion configured to determine whether the horizontal synchronization pulses are normal by comparing time differences between an input of the horizontal synchronization pulses and input of the reference pulses with the shift time; and
an extraction portion configured to extract the line image data points from the image signal in synchronization with the input of the horizontal synchronization pulses that have been determined as normal.

2. The image signal processing device according to claim 1, wherein
the synchronization signal generating portion includes the reference signal generating portion, and
the reference signal generating portion is configured to output the reference pulses such that the reference pulses are included in the horizontal synchronization signal that also serves as the reference signal.

3. The image signal processing device according to claim 2, wherein
the determination portion determines that the horizontal synchronization pulses are normal in a case where the time differences between the input of the horizontal synchronization pulses and the input of the reference pulses to the horizontal synchronization signal correspond with the shift time and, at the same time, where third pulses are not input to the horizontal synchronization signal within an observation time set in advance.

4. The image signal processing device according to claim 1, wherein
the shift time is longer than 200 nanoseconds.

5. An image reading apparatus comprising:
an image reading portion configured to sequentially read single line images, each serving as an image of a single line extending in a main scanning direction, from a document sheet and to output an image signal that sequentially transmits line image data points that represent the single line images;
a synchronization signal generating portion configured to generate and output a horizontal synchronization signal that sequentially transmits horizontal synchronization pulses synchronized with timing of reading the single line images; and
the image signal processing device according to claim 1 configured to extract the line image data points from the image signal in synchronization with input of the horizontal synchronization pulses.

* * * * *